United States Patent

Persson

[11] Patent Number: 6,026,947
[45] Date of Patent: Feb. 22, 2000

[54] APPARATUS FOR TRANSFERRING OBJECTS FROM A FIRST TO A SECOND CONVEYOR

[75] Inventor: Agne Claes Persson, Naantali, Finland

[73] Assignee: Swedefish Machinery AB, Sweden

[21] Appl. No.: 09/029,028

[22] PCT Filed: Aug. 21, 1996

[86] PCT No.: PCT/SE96/01032

§ 371 Date: Feb. 21, 1998

§ 102(e) Date: Feb. 21, 1998

[87] PCT Pub. No.: WO97/09257

PCT Pub. Date: Mar. 13, 1997

[30] Foreign Application Priority Data

Aug. 24, 1995 [SE] Sweden .................................. 9502943

[51] Int. Cl.[7] .................................................. B65G 37/00
[52] U.S. Cl. .......................................... 198/364; 198/597
[58] Field of Search ............................... 198/364, 370.07, 198/457.05, 597, 526, 529, 535

[56] References Cited

U.S. PATENT DOCUMENTS 3,771,648  11/1973  Revuelta ................................. 198/364
3,823,811  7/1974  Brockmuller ........................... 198/597
4,469,319  9/1984  Robb et al. ............................. 271/3.1
4,754,864  7/1988  Cross, Jr. .............................. 198/526 X
4,889,223  12/1989  Bergstrom ............................... 198/364

FOREIGN PATENT DOCUMENTS 9202146  11/1992  Netherlands .

*Primary Examiner*—James R. Bidwell
*Attorney, Agent, or Firm*—Fasth Law Offices; Rolf Fasth

[57] ABSTRACT

An apparatus and a method for transferring an irregular stream of objects from a first conveyor to a second conveyor in such a way that the objects form a regular stream of objects on the second conveyor. The first conveyor operates at a higher conveying speed than the second conveyor and for some distance in parallel with the second conveyor. A deflection device for movable deflection of objects between the two conveyors is provided synchronized with the movement of the second conveyor. The objects being conveyed upon the first conveyor are deflected from this conveyor over to the second conveyor at various points along the above mentioned distance, depending upon how closely the objects are transported on the first conveyor.

10 Claims, 3 Drawing Sheets

APPARATUS FOR TRANSFERRING OBJECTS FROM A FIRST TO A SECOND CONVEYOR

FIELD OF THE INVENTION

The present invention refers on the one hand, to an apparatus for transferring an irregular stream of objects from a first conveyor to a second conveyor in such a way that the objects form a regular stream of objects on the second conveyor, wherein the first conveyor operates with a higher conveying speed than the second conveyor and for some distance in parallel with said second conveyor, and on the other to a method for accomplishing said transferring.

BACKGROUND OF THE INVENTION

The state of the art comprises many examples of machines which operate according to the principle that an irregular flow of objects, e.g. fishes, are to be synchronised to the pace of a conveyor.

Industrial handling of easily damaged objects may however be difficult to automatize. One example of such an activity is the handling of small types of fish, e.g. herring within the canning factories. Because this type of fish has a very thin and fragile skin, it is not possible to use downscaled versions of machines for handling larger types of fish.

One reason for this is that these machines use means for synchronization the conveying of the fish to equipment for singular processing of each fish. For example, such a machine may be adapted for loading fish one by one in trays on a conveyor which conveys the fish in the trays along means for decapitating fish heads and for removal of intestines. The means for synchronization the conveying of the fish to said trays may comprise rotating brushes, barbed wheels, or means for driving the fish by pinching it. These means are thus used for retarding and accelerating single fish and if the fish comprises small fish, this handling often lead to quality-reducing damages on the fish. A contributing reason for this, is that is that small fish, e.g. small herring, varies considerably in size and they are therefore difficult to handle mechanically.

THE TECHNICAL PROBLEM

One purpose of the present invention is therefore to provide an apparatus according to the above which fulfils demands for high capacity and for careful handling of the objects.

THE SOLUTION

For this purpose, the apparatus according to the invention is characterized in deflection means for movable deflection of objects between the two conveyors, which deflection means is provided with means for synchronization with the movement of the second conveyor. The method according to the invention is characterized in that the objects are transported at a higher speed on the first conveyor than on the second conveyor, that the objects during transfer from the first conveyor is deflected from said conveyor over to the second conveyor, and that deflection of objects from the first to the second conveyor occurs at various points along said distance, depending upon how closely the objects are transported upon the first conveyor.

DESCRIPTION OF THE DRAWINGS

The invention will be described hereinafter with reference to embodiments shown in the enclosed drawings, wherein.

DESCRIPTION OF EMBODIMENTS

The following embodiments are adapted for handling fish, but other areas of application are naturally possible, e.g. handling of fruit or vegetables.

Figure 1:
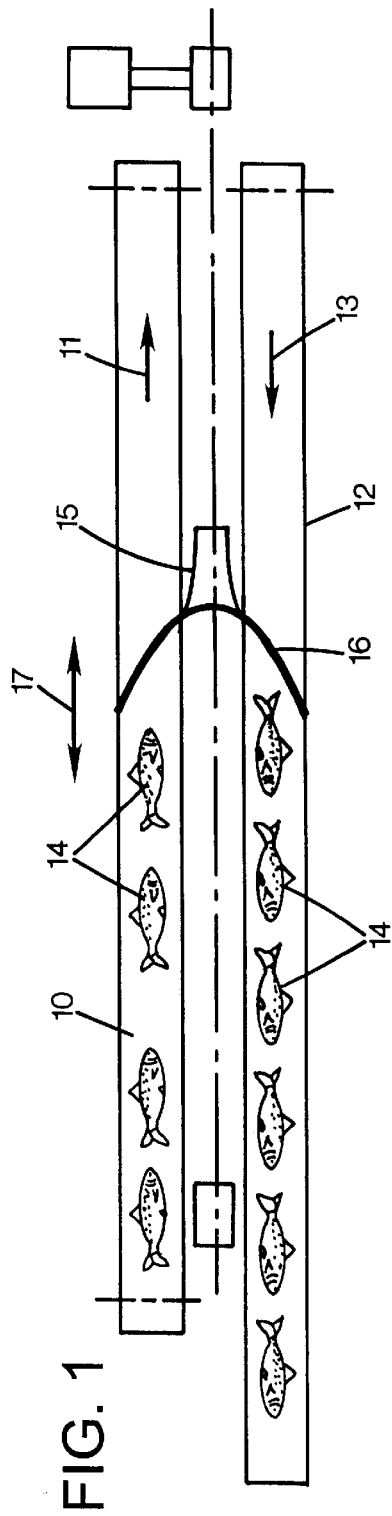
FIG. 1 shows a first, schematically depicted variant of the apparatus according to the invention in a horizontal projection.

The apparatus schematically shown in FIG. 1, comprises a first endless conveyor 10, which operates in the direction of the arrow 11, and a second endless conveyor 12, which operates in parallel with said first conveyor, but in the direction of the arrow 13.

The first conveyor 10 operates with a higher conveying speed than the second conveyor 12, which means that the fish 14 move with a higher speed on the conveyor 10 than on the conveyor 12. Also, they move in an irregular flow, so that several fish may be conveyed in close file, or be conveyed more spread out. A deflector means 15 is provided with a U-shaped deflector shunt 16 and it is movable as illustrated by the arrow 17, between the two conveyers 10, 12. When a fish 14 moves towards the shunt 16 on the conveyor 10, it will be deflected 180° over to the conveyor 12 operating in the opposite direction.

The deflector means 15 is synchronized with the second conveyor 12, so that it either may move downstream said conveyor 12, or it may move one step at a time in the direction upstream said conveyor. Detecting means is arranged at the shunt 16, for detection of the passage of a fish 14 through the deflector shunt 16. The detection means may operate mechanically or electrically and brings about that the deflector means 15 moves itself one step upstream the second conveyor 12. When the next fish passes the detection means, a new step-by-step movement of the deflector means 15 in the same direction. In the moment between and after these two step-by-step movements downstream the deflector means 15 moves itself downstream the conveyor 12 until the next fish is detected by the detection means.

The length of this step-by-step movement is adapted to the length of the objects 14, so that the objects are placed with regular distances upon the conveyor 12. If desired, the loading of objects upon the conveyor 12 follows a given pattern, so that regular groups with a certain number of objects are arranged in sequence upon the conveyor 12.

The above described apparatus may thus transfer an irregular stream of objects from a first conveyor to a second conveyor, in such a way that the objects form a regular stream of objects on the second conveyor. The transferring is synchronized with the operation of the second conveyor 12, but in such a way that it is the objects on the first conveyor 10 which controls deflection by the deflection means to the second conveyor 12.

The conveyor 10 in the above described embodiment may for example comprise a gravity chute which slopes in the direction of the arrow 11. The deflector means 15 may be synchronized to the conveyor 12 via a hook means which is in engagement with this conveyor and is disengaged when a fish passes through the deflector shunt 16, wherein the deflector means is moved one step upstream the conveyor 12. The deflector shunt 16 may also be L-shaped instead of U-shaped, in order to orientate the fish across the longitudinal direction of the conveyor 12. For this object, the conveyor 12 may be provided with trays with vertical walls cooperating with a flap at the defector means. When a fish passes the flap, the flap is lifted out of engagement with the tray, whereafter the flap may engage the next following tray.

Figure 3:
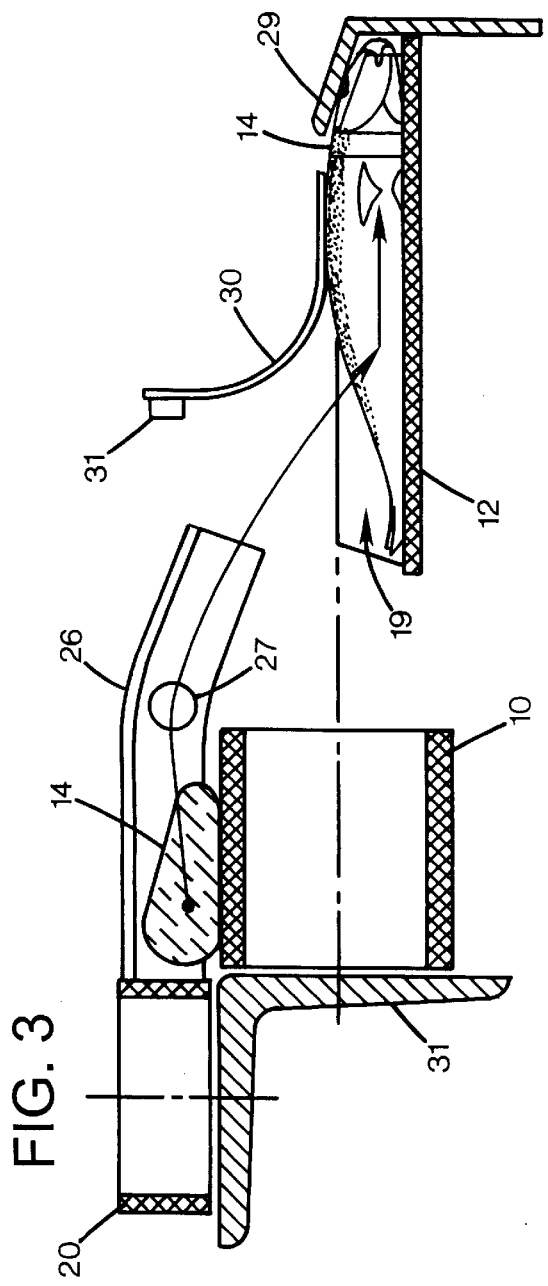
FIG. 3 is a section along the line III—III in FIG. 2.
Figure 2:
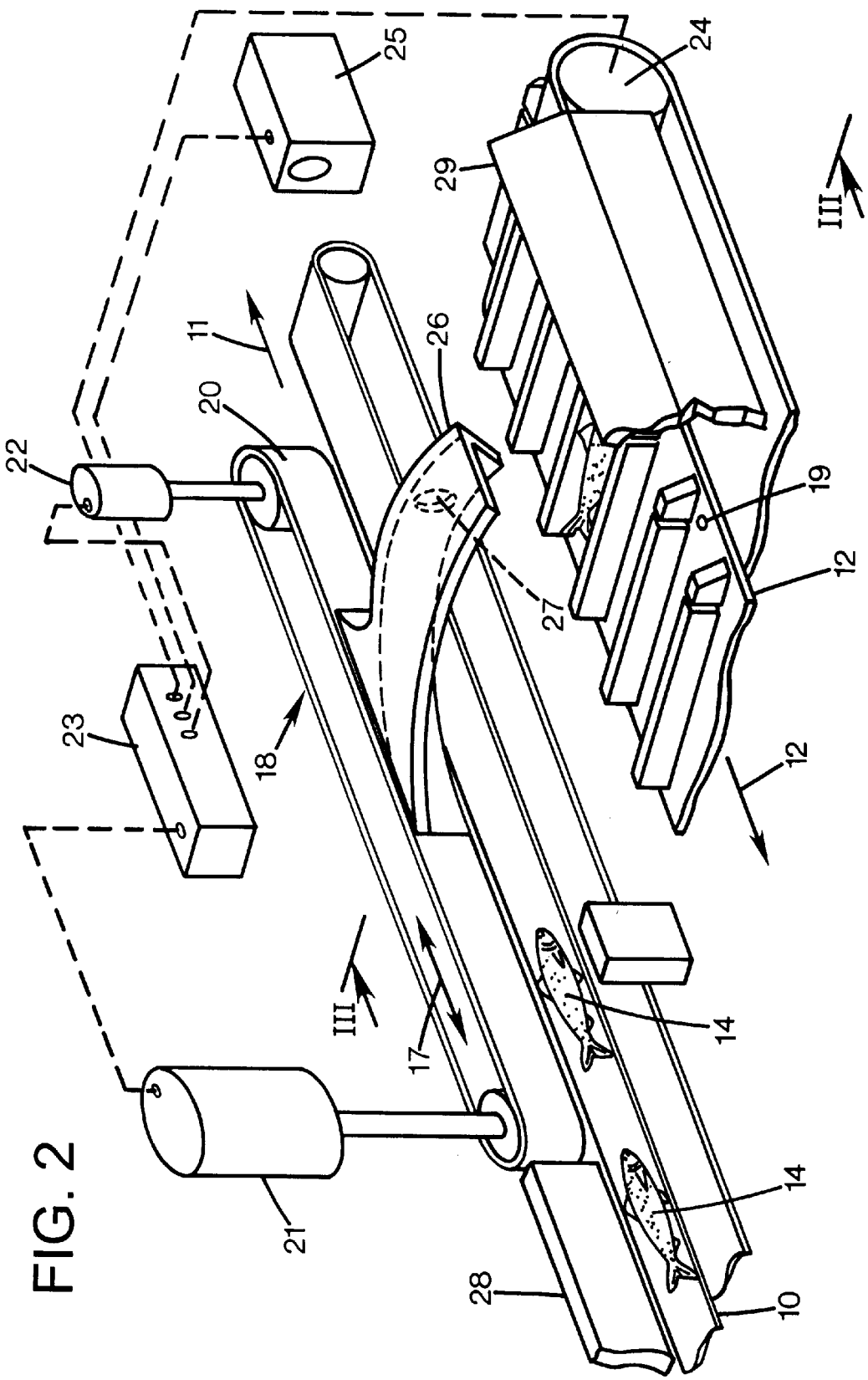
FIG. 2 shows in more detail in a perspective view a second variant of the invention.

FIGS. 2 and 3 shows a second embodiment of the invention, wherein the objects 14, fish, are orientated via the deflector means 18, so that the fish are placed side by side in trays 19 on the conveyor 12 which moves in the direction of the arrow 13. The capacity of the conveyor 12 may for example be about 400 fishes per minute.

The fish 14 is conveyed forward in the direction of the arrow 11, with irregular distances upon the endless conveyor 10, orientated in the same direction with reference to the head and the dorsal fin. The conveying speed of the conveyor 10 may for example be about 5 meters per second.

The deflection means 18 comprises an endless tooth belt 20, which is driven in optional direction by means of two in separate directions operating stepping motors 21, 22. These motors 21, 22 are electrically connected to a micro processor 23, which also is connected to a detector 24 for registration of the conveying of the trays 19 and their exact position at the conveyor 12, and to an optical detector 25 for detecting the passage of a fish through a curved deflector shunt 26, which is mounted on the tooth belt 20 and is provided with an opening 27 for the light beam of the optical detector 25.

The micro processor 23 is also electrically connected to a pivoting valve flap 28 which when detecting that the deflector shunt 26 is at the downstream end of its control range, is pivoted in over the conveyor 10 and brings a number of fish to be diverted from the conveyor 10, for recirculation in accordance with prior art.

When the fish 14 are conveyed by the conveyor 10, they have been accelerated by it up from a somewhat lower conveying speed. This results in that the fish are conveyed towards the deflector shunt 26 with a certain irregular reciprocal distance. The deflector shunt 26 is so designed that a fish substantially maintains its inertia while being turned 90° by the conveyor 10 down into the tray 19 on the conveyor 12. A stop means 29 defines the position of the fish in the tray 19. A brake means 30, e.g. in the form of a ductile rubber disc absorbs a large part of the inertia of the fish in the moment before the head of the fish reaches the stop means 29. The rubber reed 30 is mounted at a stand frame 31 which also carries the conveyors 10, 12 and the deflector means 18.

Because the inertia of the fish is substantially maintained until it rests inside the tray 19, the dynamic forces which occur when the fish passes through the deflector shunt 26 and down into the tray 19, are used for securing the orientation of the fish. When the fish glides through the deflector shunt 26, the fish is pressed towards its deflector surfaces while simultaneously being bent in the longitudinal direction, wherein it is being prevented from being rotated around its longitudinal axis. When the fish then slides down into the tray 19, further alterations in the direction of movement of the fish takes place, first downwards and then back to being in parallel with the upper side of the conveyor 12. These changes in direction generates forces which influences the fish and which result in that fish of size down to a few in multiples of ten grams may be handled as stable with reference to their orientation as fishes that are considerably more heavy.

Figure 4:
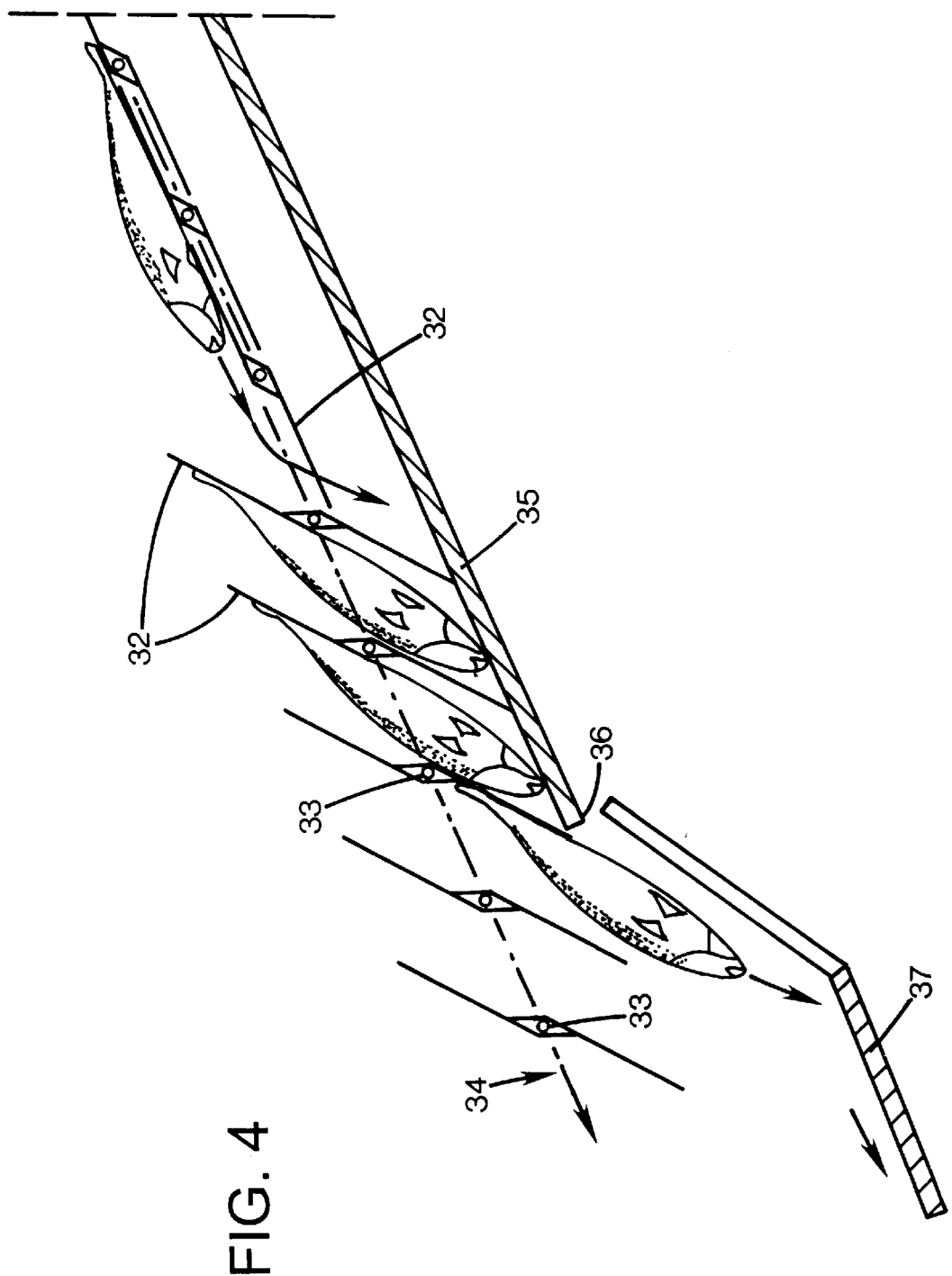
FIG. 4 shows a section of still another variant of the invention in a side view.

FIG. 4 shows still another variant of the invention, where a first conveyor is designed as an inclined plane, which is formed by a series of flaps 32 being pivotally connected via pegs 33 to a chain 34. The chain 34 forms in conjunction with the bottom wall 35 a second conveyor which deliver one fish at a time at an end edge 36 to a following tray conveyor 37. The flaps 32 normally strive to occupy a neutral position in parallel with the inclined plane. An irregular flow of fish glide downwardly along this plane with their head first. When such a fish reaches a pivoted flap, this fish will be guided downwards with the head against the in FIG. 4 shown left half of the preceding flap. Then this flap will pivot around its peg 33, so that the fish may slide down with the head against the bottom wall 35. The next following fish is guided in the same way down towards the bottom wall 35 by the recently pivoted flap. Consequently, the irregular stream of fish will be transferred into an irregular stream also by this embodiment of the invention.

The invention is not limited to the above described embodiment, instead more variants are conceivable within the scoop of the following claims. For example, the conveyor 12 and the deflector means 15, 18 may be designed in many different ways than shown. The expression "conveyor" may comprise an endless belt conveyor with or without trays for fish or other objects, but the expression also comprises other types of conveyors such as chutes etc., which may use gravitation, air jets or water jets as propelling force.

I claim:

1. An apparatus for transferring objects, the apparatus comprising:
   a first conveyor conveying the objects at a first conveying speed, the first conveyor conveying an irregular stream of the objects;
   a second conveyor in operative engagement with the first conveyor and parallel thereto, the second conveyor conveying the objects at a second conveying speed and conveying a regular stream of the objects, the first conveying speed being greater than the second conveying speed;
   a movable deflector member disposed between the first and the second conveyor for transferring the objects from the first conveyor to the second conveyor; and
   a synchronizer in operative engagement with the first and second conveyor to synchronize the movement of the deflector member to the second conveying speed.

2. The apparatus according to claim 1 wherein the deflector member is movable along the first and the second conveyor and the deflector member is mechanically synchronized to the second conveyor.

3. The apparatus according to claim 1 wherein the deflector member is movable along the first and the second conveyor and the deflector member is electronically synchronized to the second conveyor, the deflector member further comprises a driving mechanism for detecting a position of the deflector member relative to a position of the second conveyor, the apparatus further comprises a detector for detecting objects that pass through the deflector member.

4. The apparatus according to claim 1 wherein the first conveyor is disposed above the second conveyor.

5. The apparatus according to claim 4 wherein the deflector member comprises a curved extension that extends from an upper side of the first conveyor towards an upper side of the second conveyor.

6. The apparatus according to claim 5 wherein the apparatus further comprises a damping mechanism for damping an inertia of the objects on the second conveyor.

7. A method for transferring objects from a first conveyor to a second conveyor, the method comprises the step of:

providing an irregular stream of objects and conveying the objects on the first conveyor;

providing a second conveyor that is substantially parallel to the first conveyor;

transporting the objects on the first conveyor at a first speed;

deflecting the objects from the first conveyor to the second conveyor with a deflector;

synchronizing a position of the deflector along the first and second conveyors to positions of the objects in the irregular stream conveyed on the first conveyor so that the objects form a regular stream of objects on the second conveyor; and transporting the objects on the second conveyor at a second speed, the first speed being greater than the second speed.

8. The method according to claim 7 wherein the method further comprises the step of moving the deflector upstream relative to a direction of travel of the second conveyor when an object is deflected from the first conveyor to the second conveyor.

9. The method according to claim 8 wherein the method further comprises the step of moving the deflector downstream relative to the direction of travel of the second conveyor until another object is deflected from the first conveyor to the second conveyor.

10. The method according to claim 7 wherein the method further comprises the step of moving the first conveyor in a first direction and moving the second conveyor in a second direction, the first direction being opposite the second direction.

* * * * *